Patented Nov. 7, 1939

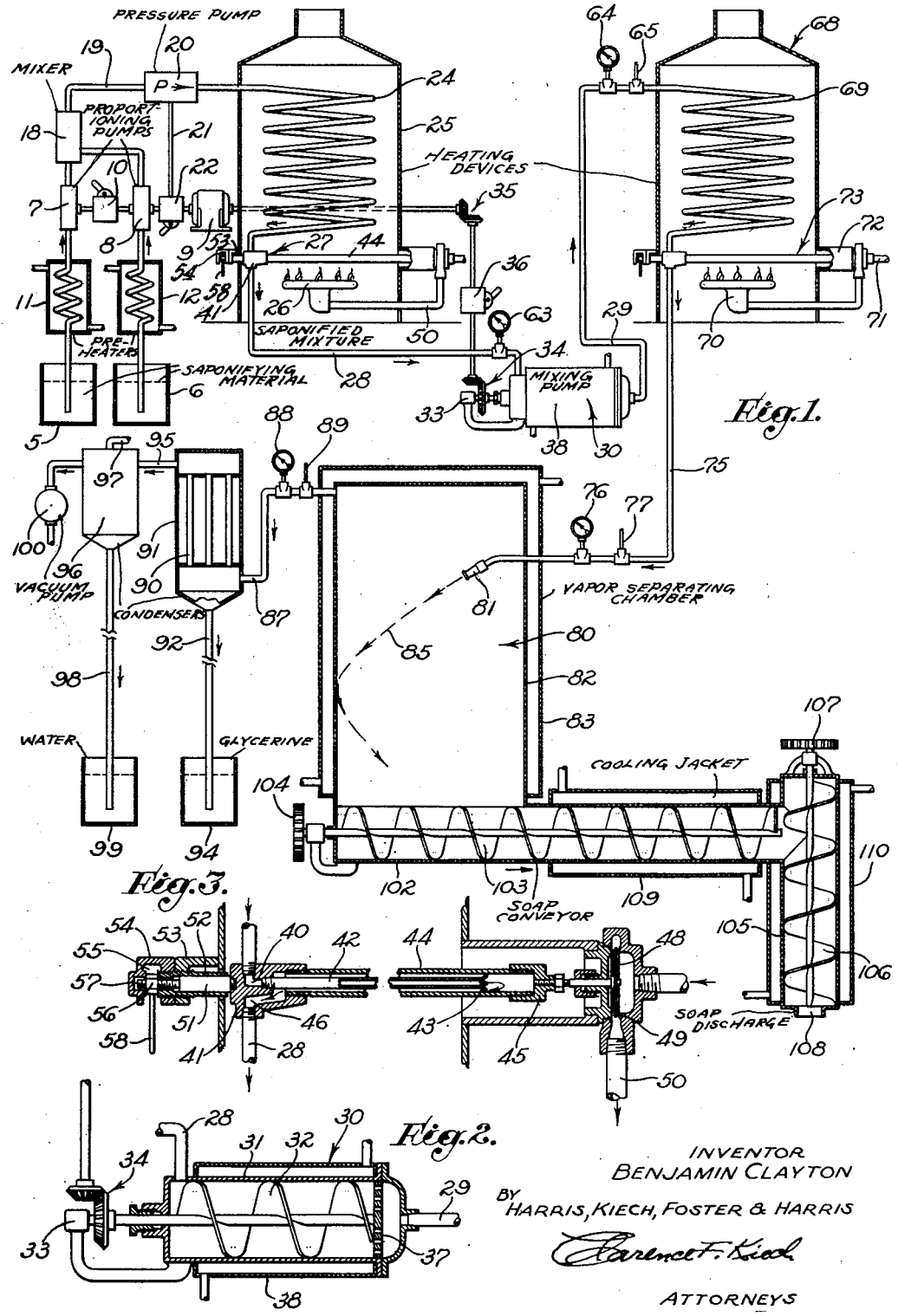

2,178,987

UNITED STATES PATENT OFFICE 2,178,987

PROCESS OF MAKING SOAP

Benjamin Clayton, Houston, Tex., assignor to Refining, Inc., Reno, Nev., a corporation of Nevada Application May 28, 1937, Serial No. 145,246

10 Claims. (Cl. 260—418)

My invention relates to a novel method and apparatus for saponifying materials and removing vapors therefrom. More particularly, it relates to a novel method and apparatus for making soap in which glycerine can be continuously removed.

It is known that a material selected from the group including fats, oils, greases, fatty acids and like substances, herein-termed a "saponifiable material," can be saponified by an agent, such as caustic soda, caustic potash or similar saponifying substances, usually alkaline, herein-termed a "saponifying material," by batch or continuous operations to form soap. The continuous method involves saponification of a suitable mixture during flow through a heater preferably of the type providing a coil in which heat is applied during stream flow. It has been proposed to progressively heat the stream flowing in such a coil until a temperature is reached which is sufficiently high to vaporize glycerine and water, and to separate the glycerine under vacuum conditions.

It has been found that if any material portion of the saponifiable material remains in unsaponified condition when temperatures of a glycerine-freeing value are applied, a reversion or a discoloration is likely to occur. When the entire operation takes place in one reaction zone, the products sometimes reach these higher temperatures before all of the saponifiables have been saponified. The resulting discoloration is not detrimental in making certain soaps, but is a drawback in continuously producing the whitest soaps when it is desired to remove substantially all the glycerine therefrom.

Tests indicate that the presence of a very small quantity, even a fraction of one per cent, of such unsaponified saponifiable material may cause discoloration in making certain soaps if glycerine-freeing temperatures are applied while such traces are present. It is an object of the present invention to eliminate such traces of unsaponified saponifiable material as might cause objectionable discoloration if temperatures desirable for glycerine removal are applied while they are present.

The discoloration when such traces are present can probably be attributed to a splitting or cracking of such traces of unsaponified saponifiable material when the requisite glycerine-removing temperatures are applied. The result is the formation of fatty acids, a portion of which may decompose and produce discoloration of the resulting soap. However, regardless of the reactions which actually take place, I have found that the tendency toward discoloration, which may be otherwise present in saponifying certain materials, can be overcome by the expedient of largely eliminating the presence of such unsaponified saponifiable material before subjection to the more elevated temperatures needed for glycerine removal.

If saponifying and glycerine-removing temperatures are applied in the same coil or passage, it is sometimes difficult to prevent discoloration when reacting certain saponifiable and saponifying materials. If the lower section of such a coil is kept hot enough to effect separation of the glycerine when the soap is subjected to low-pressure conditions, the upper section, in which saponification takes place, cannot usually be kept below the temperature at which the traces of unsaponified saponifiable material will cause discoloration. The increase in temperature may be quite rapid in the saponifying section of such a coil and discoloring temperatures may be reached while traces of unsaponified saponifiable material are still present, even though the saponifying reaction may progress rapidly.

Elimination of such traces can be effected by various expedients, the simplest of which involves a mixing action, and it is an object of the present invention to eliminate such traces of unsaponified saponifiable material by subjecting the soap mixture containing same to a mixing action before application of glycerine-removing temperatures.

When saponifying and glycerine-removing temperatures are applied in the same coil or passage, the mixing action therein is limited by the mild turbulence resulting from stream flow through such a passage. This in turn depends upon factors of velocity, size of the passage, etc., and also upon the viscosity of the material in the stream. In a soap-making process, this viscosity may be such as to preclude the possibility of the more intimate mixing action herein-contemplated to eliminate by conversion the traces of unsaponified saponifiable material. It is an object of the present invention to apply a more pronounced mixing action than is practical due to flow through an elongated reaction zone.

Another object of the invention is to saponify in one zone and apply glycerine-removing temperatures in another, regardless of whether or not a mixing action is utilized therebetween, thus making it possible to apply only sufficient heat to the first or reaction zone to effect the desired saponification. These zones can be of the same or different size and saponification can be effected under conditions quite distinct from those best adapted to the subsequent glycerine-removing step.

If continuous saponification is employed, the two zones may be formed by two coils and the intermediate mixing action can well be performed by a pump, and it is an object of the present invention to provide such a system.

Such an intermediate means can perform merely the mixing function or it can be used in additional capacities in the system. For example, a suitable pump permits maintenance of controlled conditions in each zone—conditions best adapted respectively for saponification and removal of glycerine. If the mixture of saponifiable and saponifying materials flows into a single coil, the pressure in the first or saponifying section thereof must necessarily be higher than in the second section. This requires saponification at higher pressure than in the zone where the higher glycerine-removing temperatures are used.

It is an object of the present invention to provide a method and apparatus in which the pressure in the saponifying zone can, if desired, be below that in the zone where glycerine-removing temperatures are employed and in which the pressure in the saponifying zone can be controlled to give best results in effecting this saponification without limitation as to the pressure desired or required to force the soap mixture through the subsequent heating zone.

Another object of the invention is to increase the pressure between the point of discharge from the saponifying zone and the point of entrance into the subsequent heating zone while at the same time exerting a mixing action on the soap mixture.

In addition, I have found it desirable, in some instances, to use a pump on both ends of a reaction zone to better control the pressure and flow conditions by their mutual action, and it is an object of the hereindescribed invention to provide such a system, irrespective of whether glycerine is subsequently removed.

A further object of the invention is to mix the soap-forming ingredients, then introduce them into a pump to effect further mixing and to increase the pressure thereon, and subsequently send the resulting mixture into a reaction zone where saponification takes place. If the reaction zone comprises a passage, such as is formed by a pipe or coil, such a system has the advantage that the pump can overcome at least partially the pressure head developed by flow through the passage and, at the same time, reduce the pressure in the mixing zone.

Another object of the invention is to use two proportioning pumps for respectively pumping the two materials into a mixing zone and to apply a pumping action in or beyond this zone to reduce the pressure required of the proportioning pumps. This permits a more satisfactory operation of many types of proportioning pumps and increases their metering accuracy. There is less chance of leakage or non-proportional delivery because of the fact that the proportioning pumps operate against this reduced pressure.

It is another object of the invention to pre-heat the saponifiable material, and sometimes also the saponifying material, before mixing. Such pre-heating involves application of temperatures higher than those previously contemplated for merely bringing the saponfiable material into condition for pumping, for desirable pre-heating temperatures are considerably above those heretofore suggested to melt the fat, for instance.

Further objects and advantages of the invention will be made evident hereinafter.

One system for carrying out the method is illustrated in the accompanying drawing, though it will be clear that the invention is not limited to the apparatus or elements therein shown. In this drawing:

Figure 1 diagrammatically illustrates a complete soap-making system.

Figure 2 is a vertical sectional view of the preferred type of mixer between the saponification zone and the subsequent heating zone.

Figure 3 is a vertical sectional view of the control means for the burners of Figure 1.

Referring to Fig. 1, tanks 5 and 6 may respectively contain the saponifiable and saponifying materials, heated, if necessary, to such temperature that they can be readily pumped therefrom. Proportioned quantities of these materials are respectively withdrawn by continuously operating proportioning pumps 7 and 8, driven by a motor or other drive means 9. Any suitable means is used for relatively varying the pumping action of these pumps, for instance a variable-speed connection 10 therebetween. If desired, pre-heaters 11 and 12 may be disposed between the tanks 5 and 6 and their respective pumps 7 and 8 to apply the desired pre-heating temperatures to either or both of the materials. Coil-type heaters are shown but these can sometimes be dispensed with in the event the higher pre-heating temperatures are not to be employed. In other instances, the pre-heating temperatures may be applied in the tanks 5 and 6.

The pumps 7 and 8 respectively discharge streams of the saponifiable and saponifying materials into a mixing zone of a mixer 18. Any suitable mixing means can be used but it has been found eminently successful to introduce one of these materials into a flowing stream of the other to form the preliminary mixture. In many instances, no additional mixing action need be used, the mixture moving directly to the saponifying zone. However, in the preferred embodiment, this mixture flows through a pipe 19 to a pump 20 which may likewise be operatively connected to the drive means 9 through a shaft 21 and variable-speed connection 22. This pump will build up the pressure requisite to send the mixture into the saponifying zone and, at the same time, it can be used to reduce the pressure in the mixer 18 so that the proportioning pumps 7 and 8 can act against a lower pressure than would otherwise be the case, with the attendant advantages previously mentioned. In addition, the pump 20 may be of a type adapted to additionally mix the materials in the event that it should be desired to further or prolong the mixing action effected in the mixer 18.

The saponifying zone is herein-illustrated as an elongated reaction zone formed by a pipe or coil 24 disposed in a shell 25 and being heated by a burner 26 which is controlled by a control means 27, if desired. Saponification takes place during stream flow of the mixture through this elongated passage and there issues from the discharge end thereof and into a pipe 28, a soap mixture including soap, glycerine, water and traces of unsaponified saponifiable material.

At this point, it is desirable to eliminate such traces of unsaponified saponifiable material, preferably by a conversion thereof, to produce a completely saponified product within the meaning of this term hereinafter set out. Various expedients can be used in this capacity but I have found it very satisfactory from a commercial angle to move the soap mixture into a mixing zone and there apply such mixing action as will insure reaction of these traces to convert same into soap. When thus mixed, the remaining traces of unsaponified saponifiable material will be quickly saponified, this action being completed either in the mixing zone or in a pipe 29 into which the product moves. If all discoloration is to be prevented, such traces of unsaponified saponifiable material should be removed before application of glycerine-removing temperatures.

A pump may be used to perform this mixing step and, if desired, may perform the additional step of increasing the pressure on the soap mixture, thus making it possible to operate at pressures lower in the saponification zone than in the subsequent zone where glycerine-removing temperatures are applied. Such a pump is indicated in Fig. 1 by the numeral 30. Various types of pumps can be used in this connection, whether of the rotary or reciprocating type. The mixing action taking place in both types of pumps is shown, the mixture in a reciprocating pump taking place mainly in the valves.

The device which I prefer to use in performing this mixing action and, if desired, a pumping action is a screw conveyor, best shown in Fig. 2. A very satisfactory mixing action results by the use thereof and such a device can also be used to somewhat increase the pressure or it may be so operated that its primary function will be to effect the desired conversion of the traces of unsaponified saponifiable material without greatly increasing the pressure on the soap mixture during passage therethrough.

Referring particularly to Fig. 2, this screw conveyor provides a housing 31 in which a screw 32 turns to move the soap mixture in a direction toward the pipe 29. The clearance between the periphery of this screw and the housing 31 is preferably small and the screw can be journalled in this housing, the thrust being taken by a bearing 33. Suitable drive means is provided for the screw and it is often desirable to drive this screw from the drive means 9. In the embodiment shown, this is effected by sets of beveled gears 34 and 35 with a variable-speed means 36 so connected as to permit change in speed of this screw. A perforated plate 37 may be disposed in the housing 31 at the end of the screw 32 so that the soap mixture is forced through the perforations to better the mixing action. However, in some instances, this perforated plate can be dispensed with. Such a screw conveyor falls within the definition of the term "pump," as this term is herein-used. It may be provided with a jacket 38 through which a material may be circulated in heat-transferring relationship with the material flowing therein. Sufficient heat may be employed at this point to maintain or increase the temperature.

On the other hand, it should be clear that the desirable mixing action can be obtained by means other than a pump. For example, the mixing action can be performed by setting up in the soap mixture a turbulence greater than that normally present in the coil 24. The control means 27 may be used in this capacity, either to the exclusion of the pump 30 or to supplement the mixing action of such a pump. In other instances, a separate turbulence-producing means can be used. In Fig. 3, there is shown a control means which serves the dual purpose of controlling the heat applied to the reaction zone and effecting mixing through turbulence incidental to a reversal of direction of flow therethrough.

Referring particularly to Fig. 3, the coil 24 discharges into a passage 40 of a head 41 and the soap mixture flows rightward in an inner tube 42 providing an open end 43 which is split and flared so as to be centralized with respect to an outer tube 44. The right-hand end of the tube 44 is closed by a movable head 45 so that the soap mixture must reverse its flow and move leftward through the annular space between the inner and outer tubes 42 and 44, being discharged through a passage 46 of the head 41 into the pipe 28.

The head 45 moves horizontally in response to the expansion and contraction of the outer tube 44. Attached to this head is a valve member 48 which cooperates with a seat 49 in controlling the amount of fuel moving through a pipe 50 to the burner 26. Such a control means is capable of delivering to the pump 30, or to the subsequent heater, a soap mixture of constant character and in which any desired portion of the water may be in the form of steam. On the other hand, if the presence of steam is not desired, such a control means will act in the nature of a thermostat to control the heat applied to the reaction zone. A device of this character can be designed to rather intimately mix the materials flowing therethrough, most of the mixing action taking place due to turbulence at the right-hand end of the inner tube 42 where the direction of flow is suddenly reversed.

To provide for adjustment of the control means, the head 41 may be secured to a pin 51 slidable in a sleeve 52 carried by a mounting structure 53. A rigid cap structure 54 is attached to the sleeve 52 and provides a cavity 55 in which is positioned a nut 56. This nut threadedly receives a stem 57 of the pin 51. Thus, by turning the nut 56 by means of a handle 58, the pin 51 and the head 41 are moved horizontally as a unit. Such movement can be used to adjust the space between the valve member 48 and the seat 49.

Referring again to Fig. 1, the pressure before and after moving through the pump 30 may be read from gauges 63 and 64 respectively in the pipes 28 and 29. A thermometer 65 can be used to indicate the temperature.

The pipe 29 continuously delivers the completely saponified mixture to a heater 68 wherein it is raised to a higher temperature. The preferred type of heater applies heat to the mixture during stream flow through an elongated passage defined by a pipe or coil 69. External heating of the coil 69 can be obtained by any suitable means, such as from the products of combustion from a burner 70 supplied with fuel through a pipe 71. A valve structure 72 may be used to control the amount of fuel, being regulated by a suitable control means, indicated in general by the numeral 73, and which is preferably of the type shown in Fig. 3.

The heated products then flow continuously through a pipe 75 equipped with a pressure gauge 76 and a thermometer 77, and are discharged in a vapor-separating chamber 80, which is preferably maintained under vacuum. If desired, a nozzle 81, providing a restricted orifice, can be used for thus discharging the products, in which event such a nozzle will act to build up a low back pressure in the coil 69 and can be made to liberate additional glycerine vapors by flashing when the products move therethrough. Usually, however, it is better not to throttle the flow too much at this point but to operate at sufficiently high temperature that much of the glycerine is in vapor form in the pipe 75. In many instances, no restriction of the passage at the point of discharge need be used.

If substantially all of the glycerine is to be removed, I have found it desirable to collect the soap in the vapor-separating chamber 80 in molten, plastic or semi-plastic condition. To facilitate this end, a container 82, which defines the vapor-separating chamber 80, can be surrounded by a jacket 83 through which a suitable heating medium can be circulated, or steam or other hot gaseous medium may be introduced directly into the vapor-separating chamber 80 to apply heat thereto and also to facilitate glycerine separation under the law of partial pressures. Heat thus applied is also of value in facilitating glycerine separation in the chamber 80 and preventing condensation therein. Separation of glycerine vapor is further facilitated by so directing the incoming products that they impinge against and flow downward along the inner wall of the container 82, for instance in a path indicated by the dotted line 85.

If water has not previously been separated from the saponified mixture or product, this water can be withdrawn in vapor state along with the glycerine vapors. In the system shown, such vapors are continuously withdrawn through a pipe 87, equipped with a pressure gauge 88 and a thermometer 89, at such rate as to maintain an effective vacuum in the chamber 80. As shown, these vapors move through tubes 90 of a glycerine condenser 91, a suitable cooling medium being circulated exterior of these tubes so as to condense the glycerine which then moves downward in a receiver, such as a barometric column 92 of sufficient height to counteract the vacuum and which discharges the glycerine in submerged position in a tank 94. Any uncondensed vapors are withdrawn through a pipe 95 and flow to a water condenser 96 which may be of the jet type supplied with cooling water through a pipe 97. The condensate and the cooling water move downward through a similar barometric column 98 with its lower end submerged in water in a tank 99. Any uncondensed vapors or fixed gases are continuously withdrawn by a vacuum pump 100 which is utilized in maintaining the vacuum conditions in the vapor-separating chamber 80.

The soap reaches the lower end of the vapor-separating chamber 80 in molten, plastic or semi-plastic condition in the preferred mode of operation and is preferably withdrawn continuously by any suitable means which will not impair the effective vacuum therein. In the embodiment illustrated, it moves through a suitable slot in the lower wall of this chamber into a conveyor housing 102. Delivery of the soap to this housing may be expedited by use of a suitable agitator or scraper revolving in the chamber 80, not shown. Positioned in the housing 102 is a screw 103 driven by any suitable means, such as a gear 104 operatively connected to a drive means not shown. Only a small clearance exists between the screw and the housing 102 so that the soap is continuously forced to the right along this housing and into an intersecting housing 105 provided with a screw 106 driven through a gear 107. The soap may be discharged into the atmosphere or into subsequent processing equipment by being extruded through an orifice 108.

It is very desirable to cool the soap, if withdrawn in molten, plastic or semi-plastic condition, before exposure to the atmosphere. This cooling is preferably accomplished during flow through the conveyors and I have diagrammatically shown jackets 109 and 110 around the housings 102 and 105 to cool this soap. Other cooling means can be utilized, if desired. A suitable amount of moisture, builders, fillers, perfumes and the like can be added to the soap by being introduced into the conveyor housing 105 or such materials may be subsequently added, if desired.

In operating this system to produce a neutral soap, it is desirable to use sufficient saponifying material to react completely with the saponifiable material. A slight excess can be used in the event it is desired to produce a slightly alkaline soap.

It should be clear that the invention contemplates saponifying temperatures and glycerine-removing temperatures which can be applied in different zones to obtain the advantages mentioned above. It is only necessary to supply sufficient heat to the saponifying zone formed by the coil 24 to effect saponification. The desirable temperatures and pressures in this zone will vary with different saponifiable materials and no exact ranges can be set forth. Temperatures best suited to the saponification step can readily be ascertained empirically. Usually, however, it can be said that temperatures above a range of about 425–450° F. should be avoided in the saponifying zone, though with certain saponifiable materials, it is possible to go above this range without detrimentally affecting the process. Usually, temperatures below this range are quite satisfactory and are preferred. In producing soap from such materials as tallow, vegetable oils and fats, etc., temperatures between 350 and 425° F., or even lower, are quite satisfactory in the discharge end of the reaction zone. The pressure in this zone can be varied over wide limits but it is desirable to maintain sufficient pressure to assist in the fat-splitting reaction. Pressures as indicated by the gauge 63 may range from 50 lbs./sq. in. to 250 lbs./sq. in. in most instances though the system can be operated at pressures without this range. The pressure at the discharge end of the pump 20 will be above that present at the discharge end of the reaction or saponification zone by an amount substantially equal to the friction head developed by flow through this zone.

Temperature and pressure conditions in the saponifying zone can be correlated to vaporize none or a material proportion of the water. With the screw-type mixing means shown in Fig. 2, the soap mixture can be satisfactorily handled even though a large percentage of the water has been vaporized, if this mode of operation is desired, and there will be no clogging, binding or vapor lock. Other types of pumps operating to substantially increase the pressure will sometimes require limitation of the amount of steam present in the intake of such a pump. The invention is capable of a mode of operation in which no steam is formed in the saponification zone or in which a material portion or all of the water has thus been converted into vapor state.

Heat applied to the saponification zone formed by the coil 24 may be supplemented by pre-heating of the soap-making materials, and many advantages accrue from pre-heating the saponifiable material and, in some instances, the saponifying material. The desirable pre-heating temperatures are above those necessary to put the usual fat in such condition that it can readily be pumped. Temperatures in the neighborhood of 100–120° F. usually suffice in that connection but the pre-heating temperatures herein preferred are much higher. They will depend in large measure upon the particular saponifiable material utilized. With some saponifiable materials, temperatures up to or somewhat above 400° F. have been used with success with a correspondingly decreased temperature rise in the saponification zone defined by the coil 24. Usually, however, the desirable pre-heating temperatures will be below this value, and a commerical range of from about 200–350° F. will be found best. Pre-heating of the saponifying material can also be used with success though this is not essential. By pre-heating caustic, for instance, to about 100–220° F., very satisfactory action is obtained. It will be clear that these ranges are merely exemplary and can be departed from, and that such pre-heating of the saponifiable or saponifying materials is not always essential. However, pre-heating does distinctly improve the continuous saponification step and also reduces materially the pressure necessary to force the stream through the coil 24. This is probably due to the fact that, when the pre-heated saponifiable material is brought into contact with the saponifying material, a thinner and free-flowing stream results. Under pre-heating conditions, the soap which starts to form almost instantly is more in the form of a sol or jel, as distinct from a form which tends to clog or clot in the coil 24 and which results in the absence of pre-heating of the saponifiable material. Further, the reaction time is less with pre-heated materials and the continuous saponification step is more effective and efficient. In addition, the pump 20, if used, will usually operate better and more effectively if a proper degree of pre-heating is used on either the saponifiable material or the saponifying material, or on both.

Similarly, it is impossible to specify definite ranges of temperature and pressure in the heater 68. It can be said, however, that, if glycerine is to be removed, the temperature applied at this point is invariably higher than that applied in the reaction zone. The formation of vapors in this elongated passage defined by the coil 69 will be dependent upon the heat applied and the pressure therein. If a nozzle 81 is used, the entire length of this elongated passage may be at superatmospheric pressure. However, if the nozzle is dispensed with, the pressure therein will be somewhat lower and, under such conditions, the vacuum will assist in moving the completely saponified material through this passage.

If glycerine is to be substantially completely removed, it is usually necessary to supply sufficient heat to the elongated passage to vaporize the water, if still present, and usually to vaporize a portion of the glycerine. Tests indicate that glycerine removal is facilitated by supplying sufficently high temperatures, either in the elongated passage or in the chamber 80 or both, so that the separated soap is substantially anhydrous and exists in this chamber in molten, plastic or semi-plastic condition. The soap need not be in such condition that it is extremely liquid if the higher temperatures requisite to this condition are not desired. Substantially all of the glycerine can usually be removed from most soaps made by the process if the soap is in a plastic or semi-plastic condition, as distinct from a mass of solid soap particles. With other soaps, the more liquid condition is preferable if substantially all of the glycerine is to be removed. Experiments indicate that, while there is a rather definite melting point for various soaps, once the soap has assumed this state, the temperature can be reduced many degrees below the melting point without causing the soap to become actually solidified. This factor gives a range of permissible temperatures in the vapor-separating chamber 80, the upper temperatures being considerably above the melting point of the particular soap being produced, and the lower temperature in this range being considerably below this melting temperature but above the temperature at which the mass of soap actually solidifies and departs from its semi-plastic, plastic or strictly molten condition.

If no heat is supplied to the vapor-separating chamber 80, it will be found desirable to use somewhat higher temperatures in the elongated passage formed by the coil 69 than would otherwise be the case. In making soap from cottonseed oil, temperatures above 455° F. are preferable if the soap is to be collected in molten, plastic or semi-plastic condition. With many other saponifiable materials, temperatures above 500° F. are desirable if no heat is supplied to the vapor-separating chamber 80. Temperatures from 540 to over 600° F. may be employed. All of these temperatures can be somewhat lower if heat is also supplied to the vapor-separating chamber 80 but, in most instances, I prefer to use temperatures near those mentioned above, even if additional heat is thus supplied to the chamber 80 in an amount sufficient to maintain the soap in molten, plastic or semi-plastic condition without such cooling as would cause it to depart from such condition, or if an amount of heat is added sufficient to actually increase the temperature of the soap therein. The degree of vacuum in the chamber 80 is preferably high if substantially all of the glycerine is to be removed. A vacuum of 27–28 inches of mercury is quite satisfactory. The absolute pressure therein can be considerably higher if all or a material portion of the glycerine is to remain in the soap.

If a substantially glycerine-free soap is not desired, lower temperatures can be used in this elongated passage formed by the coil 69, and the soap may collect and be withdrawn from the chamber 80 in powdered form. Even then, application of heat to the chamber 80 will facilitate glycerine removal, though I have found that substantially all of the glycerine cannot be removed commercially unless the soap is collected and withdrawn from this chamber in molten, plastic or semi-plastic condition and unless a vacuum is maintained therein. The degree of vacuum in the chamber 80 is preferably high if substantially all of the glycerine is to be removed from the soap.

Another factor in glycerine removal is the time during which the soap is in the chamber 80. If the soap is collected in molten, plastic or semi-plastic condition, the time of exposure to the vacuum can be increased by impinging the reaction products against the walls of this chamber, permitting the soap to flow down these walls with retarded velocity. Soap under the temperature conditions existing in this chamber may discolor if left therein too long, but it should remain for a time sufficient to separate the desired amount of glycerine. Continuous withdrawal after lapse of such a time is very advantageous.

As an example of the operation of the invention, I have produced a very white soap using a ratio of ten parts cocoanut oil to 7.5 parts of 31 Bé. sodium hydroxide. The reaction zone was defined by a coil of approximately ½ inch internal diameter and was about 275 feet long. The mixture moved therethrough at a velocity of about one foot per second. A pump of the rotary or gear type was found satisfactory in effecting the intermediate mixing and the elongated passage was formed by a coil of about 275 feet in length, having an internal diameter of approximately ½ inch.

In this example, the pressure at the intake end of the reaction zone formed by the coil 24 was 200 lbs./sq. in. and at the intake of the pump 30 was 125 lbs./sq. in. This pump increased the pressure slightly to about 135 lbs./sq. in. and the pressure at the discharge end of the elongated passage formed by the coil 69 was about 60 lbs./sq. in. No restricted-orifice nozzle was used in this example.

The temperature of the reaction products delivered from the reaction zone of the coil 24 was about 400° F. and this temperature was increased in the coil 69 to about 525–550° F. A vacuum of 27½ inches of mercury was maintained in the vapor-separating chamber 80 and the soap was continuously withdrawn therefrom in plastic condition in such manner as not to impair this vacuum. About 98% of the glycerine was removed.

It will be clear that various modifications can be made in the invention without departing from the spirit thereof. For instance, the saponifying step can be performed by various means other than that shown and the device 30 will still serve its desirable function of converting any unsaponified saponifiable material before application of glycerine-removing temperatures. Also, various devices can be used for heating the completely saponified products to the desired glycerine-removing temperatures though it is preferable that this heating be carried out during continuous flow. If the water is removed as a vapor along with the glycerine, various expedients can be used for condensing and separating these materials, the embodiment shown being merely illustrative. Finally, various means can be used for continuously withdrawing the soap without impairing the effective vacuum. While it is possible to operate the system with some degree of success if the soap is not continuously removed, it has been found particularly desirable, especially when the soap is in molten, plastic or semi-plastic condition, to withdraw this soap from the chamber 80 continuously.

An important feature of the invention is the saponification in a zone separate from that zone in which glycerine-vaporizing temperatures are applied. The use of two heating zones through which the materials pass in succession is of utility irrespective of the intermediate mixing step, for the temperatures in the two zones can be controlled in a manner not possible where a single coil is used. In such a single coil, it is quite possible that the high temperatures will be applied to the upper or entrance section of the coil and cause discoloration of the soap. Multistage heating corrects this and some easily saponified materials can be practically completely converted before discharge from the first heater, particularly by proper design of this heater.

On the other hand, with most saponifiable materials, an intermediate mixing by turbulence, mechanical mixing or other expedients is desirable in order to eliminate the traces of unsaponified saponifiable material before application of glycerine-vaporizing temperatures.

Another feature of the invention is the preheating of one or both of the soap-making materials with the attendant advantages mentioned above. This feature of the invention has utility regardless of the processing of the soap after moving through the saponification zone, and regardless of whether the pump 20 is used.

Another important feature of the invention is to use an auxiliary mixing means, which may well be the pump 20, between the zone where the soap-making materials first come into contact and the saponification zone, or even at the zone where these materials first contact. In some instances, the proportioned streams may be delivered directly to such a mixing means as is defined by the pump 20 whereby mixing and, if desired, increase in pressure are effected therein.

Whenever in the specification or claims the words "completely saponified" are used, they are to be understood to mean completely saponified within commercial tolerances.

Various changes can be made in the invention without departing from the spirit thereof as defined in the appended claims.

I claim as my invention:

1. A method of continuously making soap by the reaction between a saponifiable material and a saponifying material, which method includes the steps of: continuously mixing proportioned streams of said materials utilizing sufficient saponifying material to completely saponify said saponifiable material; continuously flowing the resulting mixture through an elongated saponification zone and heating same during flow therethrough to a temperature sufficient to cause substantially complete saponification while maintaining the temperature below that value at which discoloration due to traces of unsaponified saponifiable material would result, thus producing a soap mixture containing soap, glycerine and traces of said unsaponified saponifiable material; then flowing said soap mixture as a stream through a mixing zone and there intimately mixing same to cause said traces of unsaponified saponifiable material to be quickly saponified, thus producing a completely saponified soap product; and then subjecting the previously substantially and completely saponified mixture to a higher temperature sufficient to separate the vaporizable materials therefrom and to render the resultant soap molten when anhydrous.

2. A method of continuously making soap by the reaction between a saponifiable material and a saponifying material, which method includes the steps of: continuously mixing proportioned streams of said materials utilizing sufficient saponifying material to completely saponify said saponifiable material; continuously flowing the resulting mixture through an elongated saponification zone and heating same during stream flow therethrough to a temperature sufficient to cause substantially complete saponification while maintaining the temperature below that value at which discoloration due to traces of unsaponified saponifiable material would result, thus producing a soap mixture containing soap, glycerine and traces of said unsaponified saponifiable material; then flowing said soap mixture as a stream to a mixing zone and there intimately mixing same to cause said traces of unsaponified saponifiable material to be quickly saponified, thus producing a completely saponified soap product; moving a stream of said previously and substantially completely saponified soap product through an elongated passage and into a vapor-separating chamber held under vacuum while applying sufficient heat to separate glycerine from the soap as a vapor at the low pressure maintained in said chamber; and continuously removing vapor from said chamber at such rate as to maintain an effective vacuum therein.

3. A method of continuously making soap by the reaction between a saponifiable material and a saponifying material, which method includes the steps of: continuously mixing proportioned streams of said materials utilizing sufficient saponifying material to completely saponify said saponifiable material; continuously flowing the resulting mixture through an elongated saponification zone and heating same during stream flow therethrough to a temperature sufficient to cause substantially complete saponification while maintaining the temperature below that value at which discoloration due to traces of unsaponified saponifiable material would result, thus producing a soap mixture containing soap, glycerine and traces of said unsaponified saponifiable material; then flowing said soap mixture as a stream to a mixing zone and there mixing same to cause said traces of unsaponified saponifiable material to be quickly saponified, thus producing a completely saponified soap product; moving a stream of said previously and substantially completely saponified soap product through an elongated passage and into a vapor-separating chamber held under vacuum while applying sufficient heat to separate glycerine from the soap as a vapor at the low pressure maintained in said chamber and to collect the soap in said chamber in molten, plastic or semi-plastic condition; continuously removing vapor from said chamber at such rate as to maintain a vacuum therein; continuously removing said soap from said chamber without impairing the effective vacuum therein; and cooling said soap before exposure to the atmosphere.

4. A method of continuously making soap by the reaction between a saponifiable material and a saponifying material, which method includes the steps of: continuously mixing proportioned streams of said materials utilizing sufficient saponifying material to completely saponify said saponifiable material; continuously flowing the resulting mixture through an elongated saponification zone and heating same during stream flow therethrough to a temperature sufficient to cause saponification while maintaining the temperature below that value at which discoloration due to traces of unsaponified saponifiable material would result, thus producing a soap mixture containing soap, glycerine and traces of said unsaponified saponifiable material; then increasing the pressure on said soap mixture by moving a stream thereof through a pump while exerting sufficient mixing action in said pump to cause said traces of unsaponified saponifiable material to be saponified, thus producing a stream of a completely saponified soap product moving at a pressure determined by the pump; using this pressure to force said stream of said soap product through an elongated passage and into a vapor-separating chamber held under vacuum while applying sufficient heat to separate glycerine from the soap as a vapor at the low pressure maintained in said chamber; and continuously removing vapor from said chamber at such rate as to maintain an effective vacuum therein.

5. A method of continuously making soap by the reaction between a saponifiable material and a saponifying material, which method includes the steps of: continuously mixing proportioned streams of said materials utilizing sufficient saponifying material to completely saponify said saponifiable material; continuously flowing the resulting mixture through an elongated saponification zone and heating same during stream flow therethrough to a temperature sufficient to cause saponification while maintaining the temperature below that value at which discoloration due to traces of unsaponified saponifiable material would result, thus producing a soap mixture containing soap, glycerine and traces of said unsaponified saponifiable material; then increasing the pressure on said soap mixture by moving a stream thereof through a pump while exerting sufficient mixing action in said pump to cause said traces of unsaponified saponifiable material to be saponified, thus producing a stream of a completely saponified soap product moving at a pressure determined by the pump; using this pressure to force said stream of said soap product through an elongated passage and into a vapor-separating chamber held under vacuum while applying sufficient heat to separate glycerine from the soap as a vapor at the low pressure maintained in said chamber and to collect the soap in said chamber in molten, plastic or semi-plastic condition; continuously removing vapor from said chamber at such rate as to maintain a vacuum therein; continuously removing said soap from said chamber without impairing the effective vacuum therein; and cooling said soap before exposure to the atmosphere.

6. A two-step method of making soap continuously in a system providing two elongated passages, which method includes the steps of: continuously moving into one of said elongated passages a mixture of a saponifiable material and sufficient saponifying material to react completely therewith; applying heat to said one of said elongated passages to react said materials flowing as a stream therein to effect substantially complete saponification but below that at which discoloration due to traces of unsaponified saponifiable material will result; moving the resulting products from said one of said elongated passages into and through the other of said elongated passages; separately heating said other of said elongated passages to heat the stream of said previously and substantialy completely saponified product flowing therein sufficient to form vapors before discharge therefrom; and discharging the resulting products including soap and vapor into a vapor-separating chamber and there separating vapor from the soap.

7. A two-step process for making soap comprising the steps of: continuously advancing a stream of a mixture of saponifiable and saponifying materials through a low temperature coil to effect substantially complete saponification while maintaining a temperature below the melting point of the resultant soap when anhydrous, thereafter transferring the resultant mixture to a separate and independent high temperature coil and there maintaining a temperature above the melting point of the soap when anhydrous, quickly removing a stream of the mixture from the high temperature coil and introducing the same to a vapor separating chamber, continuously removing the vaporized materials and continuously removing the molten anhydrous soap from said vapor separating chamber.

8. A two-step process for the making of soap and the distillation of glycerine therefrom which comprises the steps of: continuously advancing a stream of saponifiable and saponifying materials through a low temperature coil to effect substantially complete saponification while maintaing a temperature below the melting point of the resultant soap when anhydrous, vaporizing glycerine from the mixture by subjecting the same to a separate and independent high temperature treatment, sufficient to vaporize the glycerine and to cause the resultant anhydrous soap to be in a molten condition, and continuously removing the molten soap while continuously recovering the glycerine distilled therefrom.

9. A two-step process for making soap which comprises the steps of: continuously mixing in stream flow saponifiable and saponifying materials and effecting substantially complete saponification while maintaining a temperature below the melting point of the resultant soap when anhydrous, thereafter transferring the resultant mixture to a separate and independent high temperature treating zone and there imparting a temperature substantially above the melting point of the soap when anhydrous, quickly removing a stream of the mixture from the high temperature zone and introducing the same into a vapor separating chamber, continuously removing the vaporized materials and removing the molten anhydrous soap from said vapor separating chamber.

10. A two-step process for making soap comprising the steps of: continuously advancing a stream of a mixture of saponifiable and saponifying materials through a low temperature coil to effect substantially complete saponification while maintaining a temperature below the melting point of the resultant soap when anhydrous, thereafter transferring the resultant mixture without damaging exposure to the air to a separate and independent high temperature coil and there maintaining a temperature above the melting point of the soap when anhydrous, while preventing damaging contact with the air, quickly removing a stream of the mixture from the high temperature coil and introducing the same to a vapor separating chamber, continuously removing the vaporized materials and continuously removing the molten anhydrous soap from said vapor separating chamber.

BENJAMIN CLAYTON.